Nov. 14, 1933.   O. HOFFMAN   1,935,447
PNEUMATIC BUMPER
Filed March 2, 1933
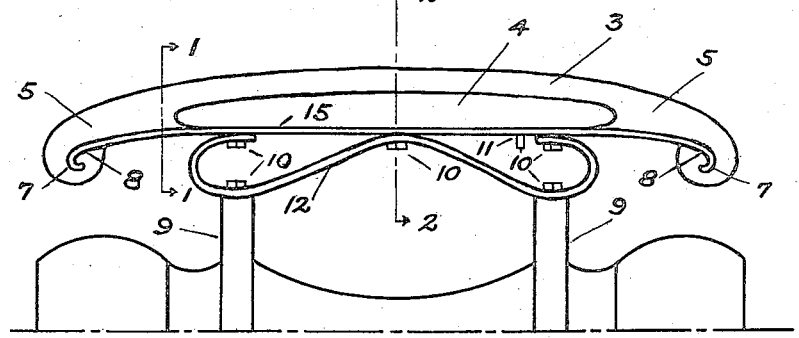
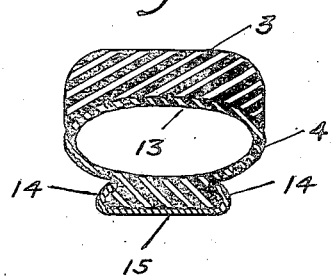   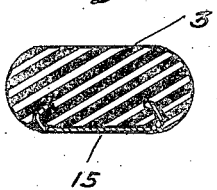
INVENTOR
Otto Hoffman Patented Nov. 14, 1933

1,935,447

UNITED STATES PATENT OFFICE 1,935,447

PNEUMATIC BUMPER

Otto Hoffman, Brooklyn, N. Y.

Application March 2, 1933. Serial No. 659,338

4 Claims. (Cl. 293—55)

My invention relates to improvements in pneumatic bumpers for automobiles; and the objects of my improvement are, first, to provide three impact absorbing members of different types, which may function successively in the case of a collision to more effectively prevent injury to persons struck or reduce property damage, as the case may be; and second, to provide, as one of the impact absorbing members, a rubber compressed air container comparatively free from the risk of rupture in the case of a severe collision. A further object is to provide a construction permitting easy removal of said air container when repairs or replacement are necessary.

I attain these objects by the means illustrated in the accompanying drawing, in which—

Figure 1 is a top plan view of my bumper as applied to the front end of an automobile;

Figure 2 is a transverse vertical section taken substantially on a broken line 2, 2 of Figure 1; and Figure 3 is a transverse vertical section taken substantially on a broken line 1, 1 of Figure 1.

Similar numerals refer to similar parts throughout the several views.

Referring more particularly to the characters of reference on the drawing, 15 indicates a metal clincher frame member having flange edges 14, to which is molded at each end section, as indicated in Figure 3, a cushioning bar, 3, of very elastic rubber. The extreme ends, 5, of this cushioning bar are shaped so as to enclose both the front surface, 7, and the rear surface, 8, of clincher frame member 15. An inflatable compressed air container, 4, preferably constructed of rubber composition similar to that commonly used for bicycle tires, is installed between the end sections, 5, of cushioning bar, 3, and is inflatable through valve, 11, in the regular manner. Wall, 13, of air container, 4, fits snugly into the concave inner surface of cushioning bar, 3; and the base of said air container is held rigidly in place by flanged edges, 14, of clincher frame member, 15. A metal spring strip, 12, is bolted to clincher frame member, 15, and to vehicle frame, 9, by means of bolts and nuts, 10, in the usual manner.

The invention is shown as installed on the front end of an automobile. It will be readily understood by those versed in the art that it can be installed on the rear end of an automobile in a similar manner.

In operation, any minor collision against the bumper is principally absorbed by the rubber cushioning bar. In the case of a minor collision with another vehicle the relatively soft surface of this cushioning bar also prevents defacing or scratching said vehicle. In the case of a somewhat heavier collision the compressed air container is, in addition, more or less deflated thereby and much of the force of the collision absorbed. In the case, however, of a violent head-on collision, the rubber cushion, the compressed air container and the metal spring successively flex to absorb as much as possible of the shock. The rubber air container is, in this case, flattened out between the rubber cushion and the clincher frame member, but no rupture of the rubber air container will ordinarily occur, because the exposed section of its side walls is free to expand and displace the imprisoned air.

It will be apparent to those skilled in the art, that when it is desired to remove the rubber air container, this can be readily accomplished by, first, releasing the compressed air through the valve, and then pushing the rubber air container away from the clincher frame member by means of a tire iron.

Having thus described my invention, what I claim as new and desire to secure by Letters Patent is as follows:—

1. A pneumatic bumper comprising a metal stiffening bar, a compression spring strip attached to one face of said stiffening bar, a bar of resilient yieldable material attached to the other face of said stiffening bar at each end, and a compressed air container of resilient yieldable material mounted between the center sections of said resilient bar and said stiffening bar and only partially enclosed by said bars.

2. A pneumatic bumper comprising a compression spring strip, a metal stiffening bar to one face of which said spring is attached, and having on the other face a clincher frame construction, a rubber bar attached to the ends of said clincher frame, and a rubber compressed air container having longitudinal flange portions adapted to engage in said clincher frame between the end sections, said air container being only partially in contact with said rubber bar.

3. A pneumatic bumper comprising a metal stiffening bar, a compression spring strip attached to one face of said bar, a rubber bar attached to the other face of said bar at each end, and a rubber compressed air container provided with means for inflating or deflating by a valve and arranged to mount between the center sections of said rubber bar and said stiffening bar but only partially enclosed by said bars.

4. A pneumatic bumper comprising a metal stiffening bar, a compression spring strip attached to one face of said bar, a rubber bar attached to the other face of said bar at each end and having a concave inner surface between said points of attachment, and a rubber compressed air container mounted between the center sections of said rubber bar and said stiffening bar and only partially enclosed by said bars.

OTTO HOFFMAN.